April 7, 1964     A. R. DAVIS     3,128,440
ELECTRICAL APPARATUS FOR CONTROLLING CURRENT AND VOLTAGE
Filed May 28, 1959     2 Sheets-Sheet 1

INVENTOR.
ARIEL R. DAVIS
BY
Frank G. Grover
his ATTORNEY

April 7, 1964　　　A. R. DAVIS　　　3,128,440
ELECTRICAL APPARATUS FOR CONTROLLING CURRENT AND VOLTAGE
Filed May 28, 1959　　　2 Sheets-Sheet 2
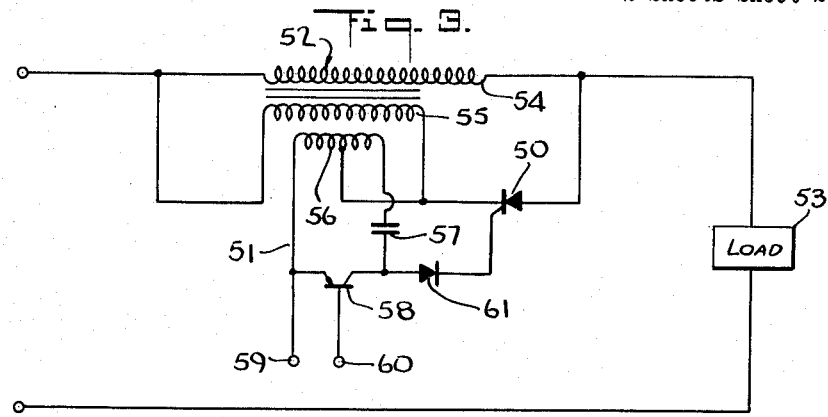
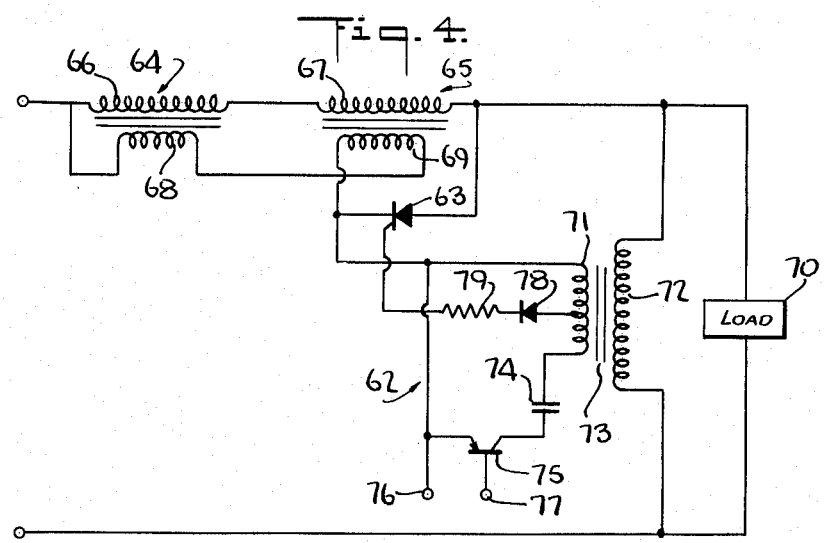
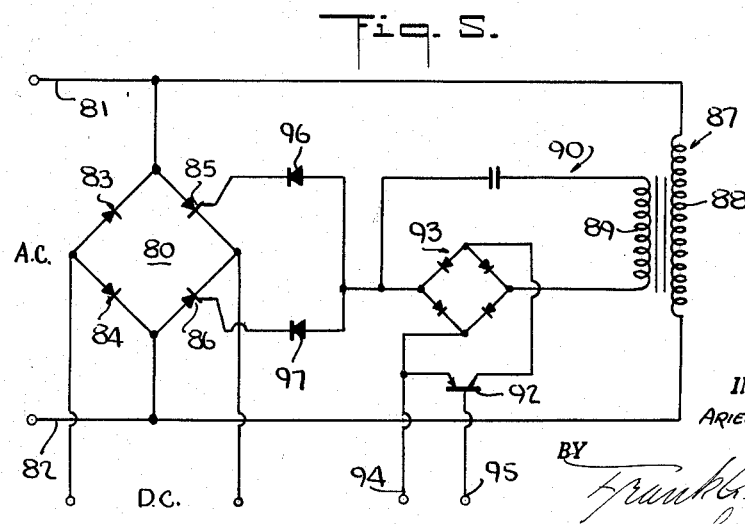
INVENTOR.
ARIEL R. DAVIS
BY
his ATTORNEY United States Patent Office 3,128,440
Patented Apr. 7, 1964

3,128,440
ELECTRICAL APPARATUS FOR CONTROLLING CURRENT AND VOLTAGE
Ariel R. Davis, 3687 S. State, Salt Lake City, Utah
Filed May 28, 1959, Ser. No. 816,641
3 Claims. (Cl. 323—60)

This invention relates to electrical devices of the static type for controlling current and voltage supplied to a load, and particularly to apparatus for supplying a voltage controlled over a wide range by a low voltage.

An object of this invention is to provide an apparatus of the static type for controlling voltages over a wide range from a remote location.

Another object of the invention is to provide a dimming apparatus utilizing silicon controlled rectifiers which permit a plurality of dimmers to be operated from a single control.

Another object of the invention is to provide a static-type voltage control which has a high speed response over a wide range and which does not produce an audio or radio frequency interfering noise.

Other and further objects of this invention will become apparent from the following description taken in connection with the drawings in which:

FIG. 3 illustrates an embodiment utilizing a silicon controlled rectifier with the phase shifting network to control a reactor;

FIG. 4 illustrates an embodiment which utilizes silicon controlled rectifiers with the phase shifting network to control a two-core reactor; and FIG. 5 illustrates an embodiment in which silicon controlled rectifiers are utilized with the phase shifting network to produce a controlled direct current.

Figure 1:
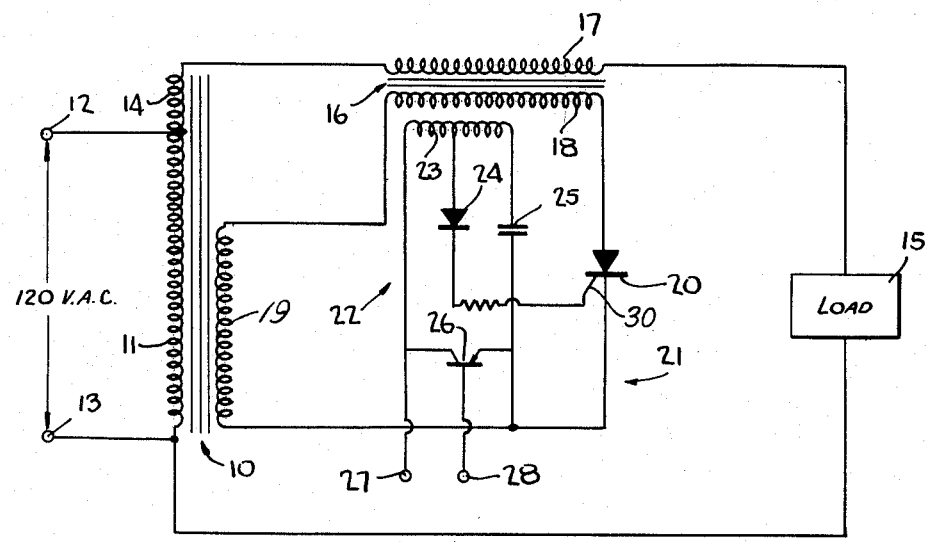
FIG. 1 illustrates an embodiment of the invention.

Referring to FIG. 1 of the drawings, the alternating voltage impressed on the input terminals 12 and 13 is boosted by the input transformer 10 and impressed across the series transformer 16 and the load 15. The input transformer 10 of the iron core type has a winding 11 connected across the input terminals 12 and 13 to receive voltage therefrom. A booster winding 14 is provided to raise the output voltage of the transformer so that a correct voltage may be applied to the load 15 to operate the load over its full operational range. The apparatus may be utilized with various types of loads. However, for the purpose of this embodiment the load is one or more incandescent lights utilized for illuminating stages, television studios, or the like. The current and voltage supplied to the load or lamps 15 is controlled by means of the impedance of the winding 17 of the iron core transformer 16. The impedance of the winding 17 is controlled by means of the current passing through the winding 18 of the transformer 16. The half wave rectified current passing through the winding 18 varies the saturation of the iron magnetic path of the transformer 16. As the core is saturated, the impedance in the winding 17 decreases and thus permits a higher voltage to be applied to the load 15. The current passing through the winding 18 is determined by the circuit 21 comprising secondary winding 19 on the input transformer 10, silicon controlled rectifier 20, and the winding 18, all connected in series. The winding 19 provides a voltage to loop circuit 21 so that the winding 17 can be made to conduct over a full positive and negative cycle. When the voltage from winding 18 goes to zero, a small voltage is available from winding 19 to extend the conduction. The amount of current flowing in the loop depends on the length of time of the conductivity of the rectifier over the half cycle of the input current. The period of conductivity of the silicon rectifier 20 is determined by the phase shifting circuit 22 which is in turn controlled by a small current applied across the terminals 27 and 28. The phase shifting circuit 22 comprises a winding 23, condenser 25 and transistor 26. The winding 23 comprises a few turns of wire around a core of the transformer 16 or on transformer 10. The gate 30 of the rectifier 20 is connected by the protective diode 24 to the phase shifting network 22 at any suitable point and preferably to the center of the winding 23. The protective diode applies a current flowing in the corresponding direction to the gate circuit and prevents flow of current in the opposite direction. When wound on the core 16 a self-clipping of the phase shifting network occurs. The condenser 25, the conductance of the transistor 26, and the inductance of the winding 23 determine the phase relation of the current passing through the diode rectifier 24 and of the signal impressed across the silicon controlled rectifier 20. The phase relationship of this current with the impressed voltage is varied by varying the voltage impressed across the terminals 27 and 28. The conductance of the transistor 26 is varied by the changes in the small current impressed across the terminals 27 and 28. The variation of this current across the transistor produces a variation in the current passing through the transistor and this current variation produces a shifting in phase. The small control current may be produced by a small voltage. The control connected across the terminals 27 and 28 may be a variable resistor, a transformer, another circuit producing a voltage, or a photoelectric cell. A number of the control leads of a dimmer circuit may be connected together and mastered from a single control.

In the operation of the apparatus the 120-volt alternating current supply is impressed across the terminals 12 and 13 and a boosted voltage is induced across winding 14. This boosted voltage is impressed through the winding 17. The pulsating direct current through the winding 18 is controlled by the silicon controlled rectifier 20 and saturates the transformer 16 and reduces the impedance of the winding 17. The maximum amount occurs when the rectifier is conducting over a full half cycle. In a typical transformer the current will flow for a larger portion of the succeeding half cycle when the rectifier is fired for a substantial portion of the preceding half cycle. Current will flow for a large part of the negative half cycle if the rectifier is fired early in the positive half cycle. This is due to the stored energy in the transformer 16. As the alternating current reverses, the current in winding 18 cannot stop due to the stored energy. The firing of the rectifier is controlled by the phasing of the signal impressed on the gate of the rectifier by the phase shifting network 22. As the current across the control terminals 27 and 28 is changed, the phase of the current supplied to the rectifier 20 by the phase shifting circuit changes so that the rectifier becomes conductive at a later portion of the cycle and, therefore, reduces the amount of current passing through the winding 18 and thereby reduces the saturation of the transformer 16. The impedance of the winding 17 then increases and less voltage is applied across the load 15, which reduces the illumination of the lamp. This shifting in phase is produced over such a range that the saturation of the core 16 by the winding 18 ceases and the full impedance of the winding 17 is placed in the power circuit. This impedance is of such a value as to cause the lamps 15 to cease to radiate light. Although the winding 18 controls the impedance of winding 17, it is coupled with winding 17 so that the excessive flux of an overload current through winding 17 does not link with winding 18. Windings 17 and 18 may be wound on separate parts of the iron core; for example, on opposite legs of a rectangular shaped core. This coupling protects the components of the circuit 21 from burning out on a short circuiting of the output of the apparatus. The delay produced by a loose coupling permits the operation of circuit breakers in the supply lines before the silicon rectifier 20 burns out from an overload. When the transformer ratio between windings 18 and 17 is 1:1, the current ratio is approximately 2:1 and thus the current through winding 17 is twice as great as that through winding 18. Other transformer ratios produce a comparable change in the current ratio. When the transformer ratio is 2:1, the current ratio is 1:1 and when the transformer ratio is 3:1, the current ratio is 1:1½.

The series transformer 16 provides a high speed of response of the control apparatus to changes in the input control voltage. However, the series transformer 16 delays the flow of the main current to provide for a rapid, yet timed, build-up of the current through the transformer. The lamps do not produce any undesirable radio or audio frequencies and the apparatus does not interfere with the audio equipment located in the studio or on the stage. Equipment adjacent to the apparatus is not affected. The series transformer 16 provides a simple form of controlling the voltage applied to the load and along with the control components forms a static control unit which has no moving parts other than the unit controlling the voltage impressed across the input control terminals 27 and 28. The series transformer 16 may be remotely located in any convenient location along with the phase shifting circuit and the silicon controlled rectifier. The remote panel then requires only a simple voltage control unit which can easily be mounted within a confined space along with the controls for the other lamps or equipment. Further, the equipment requires the use of only a single silicon controlled rectifier which substantially reduces the cost of this type of unit. The control of the phase by a small voltage permits the adjustment of the applied voltage by various type of control units and also permits the combining of a number of control apparatuses for the single control of several banks of lamps. The equipment may be connected to a master control for fading from one set of controls to another.

Figure 2:
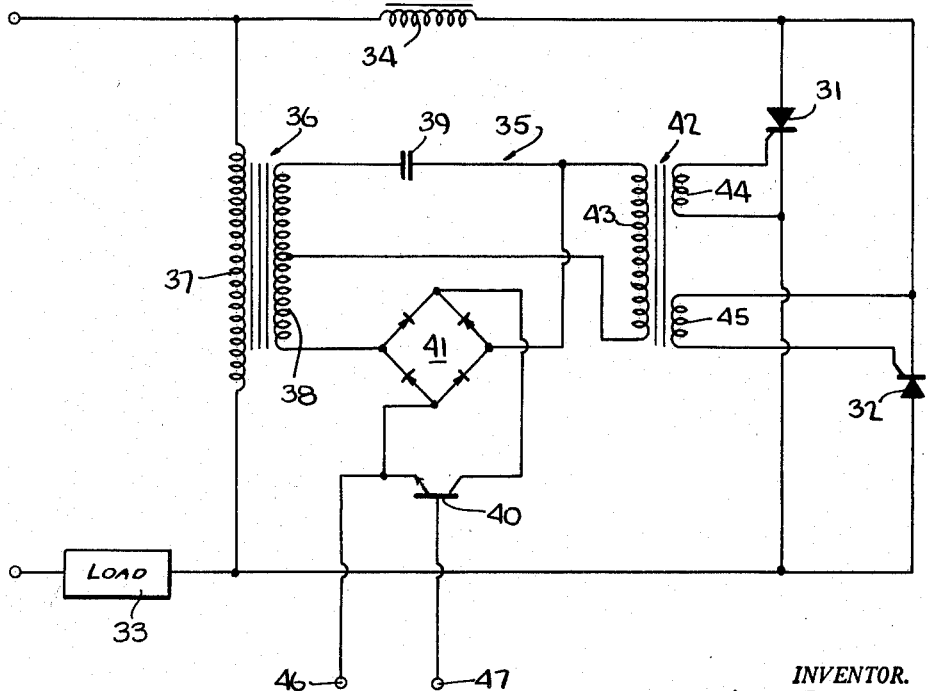
FIG. 2 illustrates an embodiment utilizing the phase shifting network to control silicon controlled rectifiers arranged back to back.

FIG. 2 illustrates another embodiment of the application of the phase shifting network to control the silicon controlled rectifiers. In this embodiment the silicon controlled rectifiers 31 and 32 are connected in back to back relation in series with the load 33. The current passes alternately between the two rectifiers 31 and 32. A choke 34 is connected in series with the rectifiers and the load to eliminate any radio frequency interference. The phase shifting network 35 is similar to the network 22 of FIG. 1. A transformer 36 has a primary winding 37 connected across the lines and a secondary 38 forming a part of the phase shifting network. A condenser 39 is connected in series with the winding 38 and the transistor 40 is connected into the circuit through a full wave rectifier 41. The full wave rectifier 41 provides for a control of both halves of the full cycle of the input alternating current. The silicon rectifiers 31 and 32 are coupled to the phase shifting network 35 through the pulse or peaking transformer 42 having a winding 43 connected to the network and secondaries 44 and 45 connected to the silicon rectifiers 31 and 32, respectively. The transformer 42 is of the peaking or pulse type. The core saturates to produce peak-type voltages to fire the rectifier. This peaking construction limits the reverse current to a very small value. The current passing through the transistor 40 is controlled by a voltage applied to the input control terminals 46 and 47. This operation is similar to that previously described in connection with the phase shifting network 22 of FIG. 1. The secondaries 44 and 45 pick up the alternating phase half cycles and alternately fire the rectifiers 31 and 32 so that a pulsating alternating current is passed through the load 33. As the voltage is varied across the terminals 46 and 47, the timing of the firing of rectifiers 31 and 32 varies to control the amount of current passing through the load.

In FIG. 3 a silicon controlled rectifier 50 and a phase shifting network 51 are utilized in connection with a reactor 52 to control the current and voltage supplied to a load 53. The reactor 52 comprises a first winding 54 and a second winding 55. The first winding 54 is connected directly in series with the load 53 and the second winding 55 is connected parallel to the winding 54 through the series silicon controlled rectifier 50. Thus, the current passing through the winding 55 also passes through the rectifier 50. The phase shifting network 51 has a winding 56 on the core of the transformer 52 and a condenser 57 and a transistor 58 controlled by the voltage applied across the terminals 59 and 60. The current is supplied from the phase shifting network to the rectifier 50 through the rectifier 61. The winding 55 controls the impedance of the winding 54. The rectifier 50 is fired by the current from the phase shifting network 51 to pass the current through the winding 55 and saturate the reactor 52, thereby adjusting the impedance of the winding 54. On the subsequent half cycle the flux stored in the core of the reactor 52 maintains the current through the rectifier 50 and maintains the impedance of the winding 54 to control the current and voltage supplied to the load 43 over the full cycle of the applied voltage.

In FIG. 4 the phase shifting network 62 and the silicon controlled rectifier 63 control the impedance of the two-core series reactors 64 and 65. Each of these reactors has a series winding 66 and 67, respectively, and a control winding 68 and 69, respectively. The series windings 66 and 67 are connected in series with the input and the load 70 and their impedance is controlled by the series connected control windings 68 and 69. The control windings are also connected in series with the silicon controlled rectifier 63. The firing of the rectifier 63 is controlled by the phase shifting network 62 which is similar to the network illustrated in FIG. 1. The phase shifting network 62 has a winding 71 coupled to the winding 72 of the transformer 73 connected across the voltage applied to the load 70. The phase shifting network has, in addition to the winding 71, a condenser 74 and a transistor 75 controlled by voltage applied across terminals 76 and 77. The current supplied from the phase shifting network to the silicon controlled rectifier 63 is supplied through the rectifier 78 and the current limiting resistor 79. This controls the firing of the rectifier 63 in the first half cycle of the input voltage. The current passing through the rectifier 63 produces a saturation of the reactors 64 and 65 to control the impedance of the windings 66 and 67. On the second half cycle the impedance is maintained by the saturating flux so that a controlled applied voltage is applied over the full cycle of the load 70.

FIG. 5 illustrates an embodiment in which a controlled direct current output is produced from an alternating current input. A rectifier bridge network 80 is connected across the alternating input lines 81 and 82 and comprises rectifiers 83 and 84 and silicon controlled rectifiers 85 and 86 on opposite sides to the rectifiers 83 and 84. A transformer 87 having a winding 88 connected across the input lines 81 and 82 provides voltage to the phase shifting network 90 through the winding 89. The phase shifting network has the condenser in series with the winding 89 and a transistor 92 connected to the phase shifting network through a full wave rectifier 93. The transistor 92 is controlled by a voltage applied to the terminals 94 and 95. This provides for a controlled current for both halves of the alternating input. The firing current is supplied from the phase shifting network to the silicon controlled rectifiers 85 and 86 through the rectifiers 96 and 97, respectively. Thus, a controlled direct current output is produced.

It is readily seen that the control apparatus may be used in connection with the voltage control of various types of equipment such as voltage control of generators, voltage and speed control, and similar equipment. Further, the control apparatus is inexpensive to manufacture in view of the few components required and the fact that the components are of the standard type of manufacture. In the foregoing embodiment the condenser in the phase shifting network may be replaced by a small reactor.

Various modifications and changes may be made in the above apparatus without departing from the scope of the invention as set forth in the appended claims.

I claim:
1. Electrical control apparatus for controlling the voltage applied to a load comprising a control transformer having a single load current carrying winding for connecting in series with a load for passing both halves of the alternating current and variable in impedance to vary the applied voltage over a wide range and having a control winding for varying the impedance of said load current carrying winding by reducing the impedance, said control transformer storing energy on passage of load current to maintain the impedance of the load current carrying winding on the succeeding half cycle at substantially the same value, a silicon controlled rectifier in series with said control winding for controlling the amount of current therethrough by variation of the phase relation of the firing current applied to the silicon controlled rectifier and the voltage applied across the rectifier, a phase shifting circuit having a transistor for varying the phase relation of the firing current produced by the phase shifting circuit and the voltage applied to the silicon controlled rectifier and a booster winding in series with said control winding and said rectifier to produce a range of initiating conduction over 0° to 180° of a half cycle.

2. Electrical control apparatus for controlling the current supplied to the output of the apparatus from a voltage applied to the input of the apparatus comprising a single silicon controlled rectifier, reactor means having a first winding in series with the output of the apparatus for passing the full cycle of the load current and a second winding controlling the impedance of the first winding and connected in series with said silicon controlled rectifier, a phase shifting network coupled to the input of the apparatus and having a winding, a condenser and a transistor connected in series, means for applying a direct voltage to the transistor to control and vary the phase of the current supplied by said network in relation to the applied voltage and thereby control the timing of the firing of the silicon controlled rectifier and the current passing therethrough, and said reactor means sustaining the flux produced by the secondary winding to control the impedance of the first winding during the succeeding half cycle to control the current supplied by the first winding to the apparatus.

3. An electrical controlling apparatus having an output for connecting to a load comprising an impedance for passing a load current to the output, said impedance passing the full cycle of the load current, flux producing means to vary said impedance in series with the output in order to vary the applied voltage, a silicon controlled rectifier in series with said flux producing means to vary the amount of current therethrough, said rectifier and flux producing means sustaining the current through the flux producing means and rectifier on cessation of the initiating half cycle of the supply voltage impressed thereon, and a phase shifting network for controlling the phase of the firing of the rectifier having a transistor for controlling the current phase of the current supplied by the phase shifting network, and means for impressing a direct voltage on the transistor to control the phase of the phase shifting circuit and means for impressing the output of the phase shifting network on the silicon controlled rectifier to adjust in relation to the initiating half cycle the firing of the rectifier in response to the controlled direct voltage and the amount of sustained current after cessation of the initiating half cycle of supply voltage to control the impedance in series with the output and the load current passing therethrough.

References Cited in the file of this patent
UNITED STATES PATENTS

| | | |
|---|---|---|
| 2,154,020 | Young | Apr. 11, 1939 |
| 2,444,472 | Schooley | July 6, 1948 |
| 2,625,676 | Konick | Jan. 13, 1953 |
| 2,666,887 | Rockafellow | Jan. 19, 1954 |
| 2,728,887 | Rockafellow | Dec. 27, 1955 |
| 2,740,086 | Evans | Mar. 27, 1956 |
| 2,757,331 | Patrusky | July 31, 1956 |